(12) United States Patent
McManus et al.

(10) Patent No.: US 10,894,382 B2
(45) Date of Patent: Jan. 19, 2021

(54) FLEXIBLE REINFORCED GASKET

(71) Applicant: GARLOCK SEALING TECHNOLOGIES, LLC, Palmyra, NY (US)

(72) Inventors: Michael McManus, Marion, NY (US); Paul Nichols, Fairport, NY (US); Sherwin Damdar, Rochester, NY (US)

(73) Assignee: GARLOCK SEALING TECHNOLOGIES, LLC, Palmyra, NY (US)

( * ) Notice: Subject to any disclaimer, the term of this patent is extended or adjusted under 35 U.S.C. 154(b) by 0 days.

(21) Appl. No.: 15/606,904

(22) Filed: May 26, 2017

(65) Prior Publication Data
US 2018/0015687 A1    Jan. 18, 2018

Related U.S. Application Data

(63) Continuation of application No. 12/783,309, filed on May 19, 2010, now abandoned.

(51) Int. Cl.
*B32B 5/02*    (2006.01)
*B32B 7/12*    (2006.01)
(Continued)

(52) U.S. Cl.
CPC .............. *B32B 5/02* (2013.01); *B32B 5/024* (2013.01); *B32B 5/028* (2013.01); *B32B 5/26* (2013.01); *B32B 7/12* (2013.01); *B32B 27/12* (2013.01); *B32B 27/322* (2013.01); *B32B 2260/023* (2013.01); *B32B 2260/048* (2013.01); *B32B 2262/02* (2013.01); *B32B 2262/0269* (2013.01);
(Continued)

(58) Field of Classification Search
CPC ........... B32B 5/02; B32B 5/024; B32B 5/028; B32B 5/26; B32B 7/12; B32B 27/12; B32B 27/322
See application file for complete search history.

(56) References Cited

U.S. PATENT DOCUMENTS 2,597,976 A    5/1952  Cousins
3,158,526 A    11/1964  Farnam et al.
(Continued)

FOREIGN PATENT DOCUMENTS

CA    2018857 A    12/1990
EP    0402909 A1    12/1990
(Continued)

OTHER PUBLICATIONS

English translation of JP 5-222352 A to Yoshida et al. obtained from European Patent Office website (Year: 1993).*
(Continued)

*Primary Examiner* — Jeremy R Pierce
(74) *Attorney, Agent, or Firm* — Perkins Coie LLP

(57) ABSTRACT

A reinforced gasket material. A non-metallic scrim layer is interposed between layers of gasket material to provide strength to the gasket material. The layers of the gasket material can include binding agent to aid adhering to each other and to the non-metallic scrim layer. The non-metallic scrim layer can also be coated in binding agent. The layers of the gasket material can include high-temperature sealing material, compressed fiber, exfoliated graphite, or polytetrafluoroethylene.

9 Claims, 1 Drawing Sheet

(51) Int. Cl.
    *B32B 5/26* (2006.01)
    *B32B 27/12* (2006.01)
    *B32B 27/32* (2006.01)

(52) U.S. Cl.
    CPC ... *B32B 2262/101* (2013.01); *B32B 2262/105* (2013.01); *B32B 2262/106* (2013.01); *B32B 2581/00* (2013.01); *Y10T 442/10* (2015.04); *Y10T 442/102* (2015.04)

(56) References Cited

U.S. PATENT DOCUMENTS

| | | | |
|---|---|---|---|
| 3,770,536 A * | 11/1973 | Haigh | B32B 27/00 156/71 |
| 4,271,228 A * | 6/1981 | Foster | C04B 26/02 442/322 |
| 4,317,575 A | 3/1982 | Cavicchio | |
| 4,319,950 A | 3/1982 | Sznopek et al. | |
| 4,423,544 A | 1/1984 | Kashmerick et al. | |
| 4,477,094 A * | 10/1984 | Yamamoto | B32B 19/04 442/378 |
| 4,508,777 A | 4/1985 | Yamamoto et al. | |
| 4,629,634 A | 12/1986 | Coughlan et al. | |
| 4,698,243 A | 10/1987 | Carl et al. | |
| 4,705,278 A | 11/1987 | Locacius et al. | |
| 4,748,075 A | 5/1988 | Beyer et al. | |
| 4,759,962 A | 7/1988 | Buecken et al. | |
| 4,786,670 A | 11/1988 | Tracy et al. | |
| 4,795,174 A | 1/1989 | Whitlow | |
| 4,834,279 A | 5/1989 | McDowell et al. | |
| 4,859,526 A | 8/1989 | Potepan et al. | |
| 4,894,128 A | 1/1990 | Beaver | |
| 4,913,951 A | 4/1990 | Pitolaj | |
| 4,961,991 A | 10/1990 | Howard | |
| 4,990,544 A | 2/1991 | Asaumi et al. | |
| 5,000,824 A | 3/1991 | Gale et al. | |
| 5,106,790 A | 4/1992 | Hashimoto et al. | |
| 5,240,766 A | 8/1993 | Foster | |
| 5,272,198 A | 12/1993 | Kaminski et al. | |
| 5,298,549 A | 3/1994 | Mecklenburg | |
| 5,437,767 A | 8/1995 | Halout et al. | |
| 5,472,995 A | 12/1995 | Kaminski et al. | |
| 5,511,797 A | 4/1996 | Nikirk et al. | |
| 5,527,599 A | 6/1996 | Hall et al. | |
| 5,615,897 A | 4/1997 | Akita | |
| 5,763,094 A | 6/1998 | Amano et al. | |
| 5,992,857 A | 11/1999 | Ueda et al. | |
| 6,117,556 A | 9/2000 | Tamaru et al. | |
| 6,398,224 B1 | 6/2002 | Erb et al. | |
| 6,399,204 B1 | 6/2002 | Shekleton et al. | |
| 6,505,839 B1 | 1/2003 | Nishimuro et al. | |
| 6,550,782 B2 | 4/2003 | Okazaki et al. | |
| 6,555,223 B2 | 4/2003 | Kubo | |
| 6,746,626 B2 | 6/2004 | Hayward et al. | |
| 7,056,250 B2 | 6/2006 | Burrowes et al. | |
| 7,104,546 B2 | 9/2006 | Bono, Jr. | |
| 7,229,516 B2 | 6/2007 | Busby et al. | |
| 2002/0000696 A1 | 1/2002 | Okazaki et al. | |
| 2002/0050692 A1 | 5/2002 | Nishimuro et al. | |
| 2004/0137302 A1 | 7/2004 | Gilman et al. | |
| 2006/0071431 A1 | 4/2006 | Corbett | |
| 2006/0100374 A1 | 5/2006 | Hamada et al. | |
| 2007/0014965 A1 | 1/2007 | Chodelka et al. | |
| 2007/0018412 A1 | 1/2007 | Bono, Jr. | |
| 2009/0001672 A1 | 1/2009 | Takahashi et al. | |
| 2009/0162672 A1 | 6/2009 | Dunn et al. | |
| 2011/0293878 A1 | 12/2011 | McManus et al. | |
| 2012/0068415 A1 | 3/2012 | Deluca et al. | |

FOREIGN PATENT DOCUMENTS

| | | | |
|---|---|---|---|
| EP | 0440116 A2 | 8/1991 | |
| EP | 511265 B1 | 6/1994 | |
| EP | 0616003 A1 | 9/1994 | |
| GB | 2020759 A | 11/1979 | |
| GB | 2468373 A | 9/2010 | |
| JP | 03044489 A | 2/1991 | |
| JP | 05222352 A * | 8/1993 | F61J 15/10 |
| JP | 2009-024877 A | 2/2009 | |
| WO | 9402760 A1 | 2/1994 | |
| WO | 2010100469 A1 | 9/2010 | |

OTHER PUBLICATIONS

International Search Report and Written Opinion for International Application No. PCT/US2013/060729, dated Feb. 18, 2014. (8 pages).

International Searching Authority; "Notification of Transmittal of the International Search Report and the Written Opinion of the International Searching Authority, or the Declaration"; Issued for PCT/US11/54743 dated May 2, 2012. (16 pages).

Extended European Search Report for Application No. EP11834847.3 dated Mar. 17, 2016 (26 pages).

European Examination Report for Application No. EP11783891.2 dated Mar. 1, 2016 (5 pages).

Supplementary European Search Report and Search Opinion of European Patent Application No. 11783891.2, dated Jul. 10, 2014, 6 pages.

International Search Report and Written Opinion dated Nov. 30, 2011 for Int. Appl. No. PCT/US2011/024897, 6 pages.

International Search Report and Written Opinion dated Oct. 20, 2011 for Int. Appl. No. PCT/US2011/024892, 7 pages.

* cited by examiner

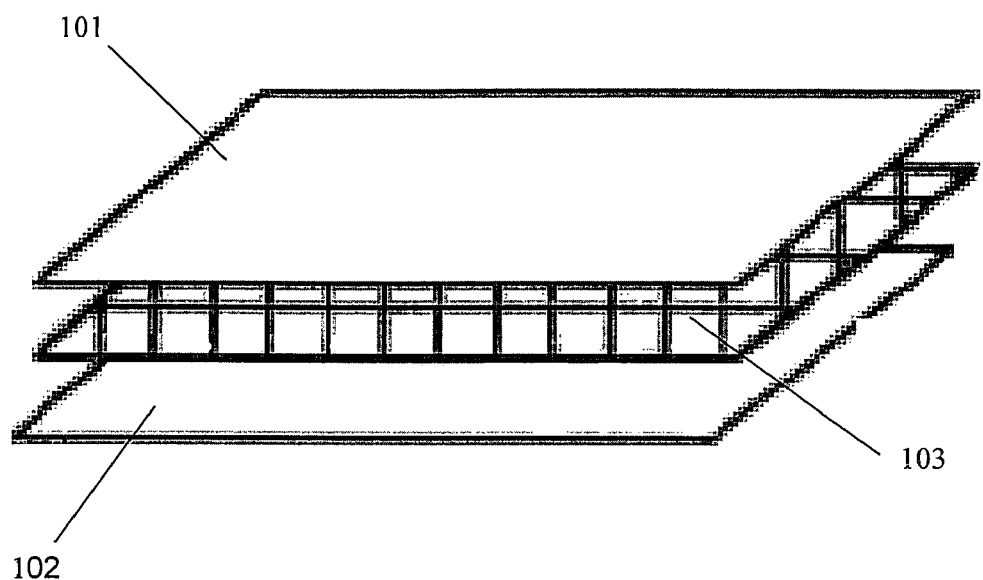

FLEXIBLE REINFORCED GASKET

BACKGROUND

Many gasket materials include metal support structures due to the fragile nature of the gasket material. For example, high temperature gasket materials (i.e., gasket materials capable of use in the range of from 850° F. to 2,000° F.) can include metal cores designed to provide strength and support to the gasket material. Without such a metal support, the gasket material is brittle and easily chipped or cracked during handling and transport.

One specific example of a gasket material with a metal reinforcement is disclosed in U.S. Pat. No. 3,158,526 to Farnam. Farnam discloses, for example, a metal core embedded within the sheet gasket material. This metal core can be made from steel, copper, aluminum, bronze, stainless steel, and other alloys. According to Farnam, the metal cores can be embedded within gasket materials of rubber or other elastomeric material, plastics, or organic or inorganic fibers. Fibers, such as asbestos, and cork may also be included within any of the previously mentioned gasket materials.

However, several concerns arise from the use of metal-supported gasket materials such as those described in Farnam. To begin with, the metal support in the gasket material is conductive, which can present numerous safety concerns. Additionally, the metal supports can result in sharp edges or protrusions when the gasket material is cut, making the handling of the metal-supported gasket material difficult and potentially dangerous. Metal-supported gasket material also can be more difficult to cut into shapes due to the presence of the metal support within the gasket material. Metal supports can also result in heavier gasket material, which can drive up shipping costs. Similarly, the gasket materials having metal supports can be more expensive due to the presence of the additional metal material within the gasket material.

For these and other reasons, a need exists for gasket materials with improved strength but that do no rely on metal supports disposed within the gasket material.

SUMMARY

In some embodiments, a reinforced gasket material is disclosed. The reinforced gasket material includes a first gasket material layer, a second gasket material layer, and a non-metallic scrim layer interposed between the first gasket material layer and the second gasket material layer. The material of the first gasket material layer and the second gasket material is high-temperature sealing material, compressed fiber, graphite, or polytetrafluoroethylene.

By using a non-metallic scrim, the reinforced gasket material overcomes many of the problems associated with gasket materials having a metal core. The reinforced gasket material has increased strength, and also is flexible, easy to handle, easy to cut, and non-conductive. Additionally, some of the materials used for the non-metallic scrim can be lighter and less expensive than the metallic cores used in the prior art.

BRIEF DESCRIPTION OF THE DRAWINGS

The accompanying drawing illustrates exemplary embodiments and is a part of the specification. Together with the following description, the drawing demonstrates and explains various principles of the instant disclosure.

FIG. 1 shows a perspective view of the layers of a reinforced gasket material as disclosed herein.

Throughout the drawing, identical reference characters and descriptions indicate similar, but not necessarily identical, elements. While the exemplary embodiments described herein are susceptible to various modifications and alternative forms, specific embodiments have been shown by way of example in the drawing and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

With reference to FIG. 1, a reinforced gasket material 100 having a non-metallic scrim 103 interposed between a first gasket material layer 101 and a second gasket material layer 102 is illustrated. The non-metallic scrim 103 is positioned between the first gasket material layer 101 and the second gasket material 102 to provide tensile strength to the reinforced gasket material 100 and help prevent the type of chipping and cracking that can occur in non-reinforced gasket materials.

The material of the first gasket material layer 101 and the second gasket material layer 102 can be selected from non-elastomeric gasket materials. In some embodiments, the material is high temperature gasket material, compressed fibers, graphite, or polytetrafluoroethylene (PTFE). The first gasket material layer 101 and the second gasket material layer 102 are preferably the same material so that a unitary gasket material is formed once the non-metallic scrim layer 103 is interposed between the first gasket material layer 101 and the second gasket material layer 102. While FIG. 1 illustrates only a single layer of gasket material above and below the non-metallic scrim layer 103, any suitable number of layers can be used above and below the non-metallic scrim layer 103, including a different number of layers above the non-metallic scrim layer 103 than the number of layers below the non-metallic scrim layer 103.

The thickness of the first gasket material layer 101 and the second gasket material layer 102 can be any suitable thickness suitable for use in a gasket material. Additionally, the thickness of the first gasket material layer 101 can be different from the thickness of the second gasket material layer 102. In some embodiments, the thickness of the first gasket material layer 101 and the second gasket material layer 102 ranges from about 1/64 inches to about 1/8 inches.

In some embodiments, a binding agent is included in the first gasket material layer 101 and/or the second gasket material layer 102. The binding agent can aid in creating a bond between the first gasket material layer 101 and the non-metallic scrim layer 103 and between the second gasket material layer 102 and the non-metallic scrim layer 103. Any suitable binding agent can be used. In some embodiments, the binding agent is an organic binding agent. Suitable organic binding agents include, but are not limited to, styrene-butadiene resin (SBR) and nitrile-butadiene resin (NBR).

As mentioned above, the first gasket material layer 101 and the second gasket material layer 102 can be a high temperature gasket material. High temperature gasket materials are typically those gasket materials that can be used in temperatures ranging from 850° F. to 2,000° F. In some embodiments, the high temperature gasket material used for the first gasket material layer 101 and the second gasket material layer 102 includes non-oxidizing high temperature filler, high temperature fiber, and binding agent. In some embodiments, the non-oxidizing high temperature filler is present in the range of 80 wt % or greater of the high temperature gasket material, the high temperature fiber is present in the range of 20 wt % or less of the high temperature gasket material, and the binding agent is present in the range of 6 wt % or less of the high temperature gasket material.

Any non-oxidizing high temperature filler suitable for use in high temperature gasket material can be used. In some embodiments, the non-oxidizing high temperature filler is an inorganic, thermal stable filler. Suitable fillers include, but are not limited to, mica, vermiculite, talc, wollastonite, kaolinite, pryrophite, and other fillers in the silicate family.

Any high temperature fibers suitable for use in high temperature gasket material can be used. Suitable fibers are manufactured by Lapinus™, Fiberfrax™, Superwool™, and Belcotex™. In some embodiments, the high temperature fiber is a ceramic fiber or a zirconia fiber. Other suitable fibers include man-made vitreous fibers including, but not limited to, continuous-filament glass, glass wool fibers, rock wool, slag wool, refractory ceramics, and special purpose fibers.

Any binding agent suitable for use in high temperature gasket material can be used. As discussed above, the binding agent can be an organic binding agent, such as NBR or SBR.

In some embodiments, the gasket material of the first gasket material layer 101 and the second gasket material layer 102 is compressed fiber. Any suitable fiber can be used for the gasket material. Exemplary fiber includes, but is not limited to aramids, mineral wools, ceramic fibers, and glass fibers. In some embodiments, the compressed fiber is non-asbestos compressed fiber.

In some embodiments, the non-asbestos compressed fiber gasket material includes filler, binding agent, and fiber. The filler can be present in the range of 80 wt % or less of the gasket material, the binding agent can be present in the range of 10 wt % or more of the gasket material, and the fiber can be present in the range of 2 wt % or more of the gasket material.

The filler material used in the non-asbestos compressed fiber gasket material can be any suitable filler material. In some embodiments, the filer material are low hardness fillers, such as the same filler materials described in greater detail above.

The binding agent used in the non-asbestos compressed fiber gasket material can be any suitable binding agent. In some embodiments, the binding agent can be an organic binding agent, such as the organic binding agents described in greater detail above. For example, NBR or SBR can be used in the non-asbestos compressed fiber gasket material. Other suitable binding agents include natural rubber, neoprene, ethylene propylene diene monomer (EPDM), and fluoroelastomers.

The fiber used in the non-asbestos compressed fiber gasket material can be any suitable fiber material. In some embodiments, the fiber material similar or identical to the fiber material described in greater detail above.

In some embodiments, the first gasket material layer 101 and the second gasket material layer 102 is an exfoliated graphite gasket material. Any suitable exfoliated graphite gasket material can be used. The graphite gasket material can be from 80 to 99.9% carbon, and can include graphite gasket material that is entirely or almost entirely graphite. Other materials that may be included within the graphite gasket material include inhibited exfoliated graphite, such as phosphorus inhibited graphite.

In some embodiments, the first gasket material layer 101 and the second gasket material layer 102 is a polytetrafluoroethylene (PTFE) gasket material. Any suitable PTFE gasket material can be used, including filled PTFE gasket materials. The PTFE material can be filled with materials including, but not limited to, carbon, graphite, molybdenum, disulfide, bronze, stainless steel, mica, silica, barium sulfate, and glass micro-balloons.

As mentioned above, a non-metallic scrim layer 103 is interposed between the first gasket material layer 101 and the second gasket material layer 102. The non-metallic scrim layer 103 provides strength to the gasket material 100 and makes cutting and handling of the gasket material 100 easier and safer. The non-metallic scrim layer 103 can be coextensive with the first gasket material layer 101 and the second gasket material layer 102, or can be smaller than the first gasket material layer 101 and the second gasket material layer 102 such that the non-metallic scrim 103 does not extend to one or more of the edges of the gasket material 100. The non-metallic scrim 103 also can include one or more layers stacked on top of one another between the first gasket material layer 101 and the second gasket material layer 102 to provide even further mechanical support to the gasket material 100.

The thickness of the non-metallic scrim 103 is variable, and can range from between 0.002 inches and 0.0235 inches. In embodiments where multiple non-metallic scrim layers 103 are used, the thickness of each non-metallic scrim layer 103 can be the same or can vary from layer to layer.

In some embodiments, the non-metallic scrim 103 is woven and has gaps between interwoven threads of the non-metallic scrim layer 103. Accordingly, the non-metallic scrim layer 103 can be measured by the warp or weft of the mesh size. In some embodiments, the warp or weft of the mesh of the non-metallic scrim layer 103 can range from 30 per inch to 2 per inch. Where multiple layers of the metal scrim 103 are used, each layer can have the same or different mesh sizes.

Any suitable non-metallic material can be used for the non-metallic scrim layer 103. Exemplary materials include, but are not limited to, fiber glass, ceramic fibers, aramid fibers, graphite fibers, carbon fiber, and polymeric fiber (such as polyester).

In some embodiments, the non-metallic scrim layer 103 is coated with a binding agent. Failure to coat the non-metallic scrim layer 103 with a binding agent prior to interposing the non-metallic scrim layer 103 between the first gasket material layer 101 and the second gasket material layer 102 can result in the delamination of the gasket material. The non-metallic scrim layer 103 can be coated with any suitable binding agent that will result in good adhesion between the first gasket material layer 101, the non-metallic scrim layer 103, and the second gasket material layer 102, and that will prevent delamination of the gasket material.

Any suitable method for coating the non-metallic scrim layer 103 with binding agent can be used, and any suitable amount of binding agent can be coated on the non-metallic scrim layer 103. In some embodiments, the amount of binding agent coated on the scrim layer 103 ranges from about 5 wt % to about 60 wt % of the coated scrim. In some embodiments, the amount of binding agent coated on the scrim layer 103 is 20 wt % of the coated scrim. Exemplary binding agents suitable for use in coating the non-metallic scrim layer 103 include each of the binding agents described above in greater detail (e.g., NBR, SBR, natural rubber, and EPDM), as well as materials such as PTFE, amorphous fluoropolymers, fluorinated ethylene propylene, fluoropolymer foam resin, perfluoroalkoxy copolymer resin, and ethylene-tetrafluoroethylene fluoropolymer.

In some embodiments, the coating used on the non-metallic scrim layer 103 can be selected based on the material of the first gasket material layer 101 and the second gasket material layer 102. Any coating material that is compatible with the gasket material can be used to coat the non-metallic scrim layer 103.

When the gasket material layers are made from compressed fiber (such as compressed-non-asbestos fiber) the binding agent coated on the non-metallic scrim layer 103 can be an organic binding agent. Specific binding agents suitable for use with compressed fiber include NBR, SBR, EPDM, natural rubber, fluoroelastomers, and polymeric adhesives, including those made of epoxies, resins, cyanoacrylates, and methacrylates.

When the gasket material layers are made from PTFE, the binding agent coated on the non-metallic scrim layer 103 can be PTFE, amorphous fluoropolymers, fluorinated ethylene propylene, fluoropolymer foam resin, perfluoroalkoxy copolymer resin, and ethylene-tetrafluoroethylene fluoropolymer.

When the gasket material layers are made from graphite, the binding agent coated on the non-metallic scrim layer 103 can be NBR, SBR, EPDM, natural rubber, fluoroelastomers, and polymeric adhesives, including those made of epoxies, resins, cyanoacrylates, and methacrylates.

When the gasket material layers are made from high temperature sealing material, the binding agent coated on the non-metallic scrim layer 103 can be NBR, SBR, EPDM, natural rubber, fluoroelastomers, and polymeric adhesives, including those made of epoxies, resins, cyanoacrylates, and methacrylates.

The manner of inserting the non-metallic scrim layer between the first gasket material layer 101 and the second gasket material layer 102 and the non-metallic scrim layer 103 together can be by any suitable means, and in some embodiments, may depend on the type of gasket material used in first gasket material layer 101 and second gasket material layer 102.

In embodiments where compressed fiber is used for the first gasket material layer 101 and second gasket material layer 102, the non-metallic scrim layer 103 is inserted before the compressed fiber gasket material layers are densified and cured. After densification and curing, the non-metallic scrim layer 103 will become adhered between the first gasket material layer 101 and second gasket material layer 102. The presence of binding agent in the first gasket material layer 101 and second gasket material layer 102 may further aid in adhering the non-metallic scrim layer between first gasket material layer 101 and second gasket material layer 102.

In embodiments where PTFE is used for the first gasket material layer 101 and second gasket material layer 102, the non-metallic scrim layer 103 is inserted before the PTFE gasket material layers are sintered. After sintering, the gasket material layers will adhere to on another and thereby secure the non-metallic scrim layer 103 between the gasket material layers.

In embodiments where graphite is used for the first gasket material layer 101 and second gasket material layer 102, the non-metallic scrim layer 103 is inserted before calendaring or densification of the gasket material layers occurs.

In embodiments where high temperature gasket material is used for the first gasket material layer 101 and the second gasket material layer 102, the non-metallic scrim layer 103 is inserted prior to a densificatation step, such as by calendaring or pressing the gasket material.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A reinforced gasket material comprising:
   a first gasket material layer;
   a second gasket material layer; and
   a non-metallic scrim layer interposed between the first gasket material layer and the second gasket material layer and having an organic binding agent coated on the non-metallic scrim layer;
   wherein the first gasket material layer and the second gasket material layer comprise a high-temperature sealing material that is operable in temperatures ranging from 850° F. to 2,000° F. (454.44° C. to 1093.33° C.), the high-temperature sealing material comprising:
   80 wt % or greater non-oxidizing high temperature filler, wherein the non-oxidizing high temperature filler is a non-oxidizing high temperature silicate filler;
   20 wt % or less high temperature fiber, wherein the high temperature fiber is selected from the group consisting of ceramic fibers, mineral wools, and glass fibers; and
   6 wt % or less binding agent, wherein the binding agent is the same organic binding agent as used to coat the non-metallic scrim layer, wherein the organic binding agent is selected from a group of organic binding agents consisting of nitrile-butadiene resin (NBR) and styrene-butadiene resin (SBR).

2. The reinforced gasket material as recited in claim 1, wherein the non-metallic scrim layer comprises fiber glass, ceramic fibers, aramid fibers, graphite fibers, carbon fiber, and polymeric fibers.

3. The reinforced gasket material as recited in claim 2, wherein the non-metallic scrim layer comprises two or more non-metallic scrim layers.

4. The reinforced gasket material as recited in claim 1, wherein the non-metallic scrim layer is a woven non-metallic scrim layer having a warp or weft of the mesh in the range of from 30 per inch to 2 per inch.

5. The reinforced gasket material as recited in claim 1, wherein the non-metallic scrim layer has a thickness in the range of from 0.002 inches to 0.025 inches.

6. The reinforced gasket material as recited in claim 1, wherein the non-metallic scrim layer is densified and cured to the first gasket material layer and the second gasket material layer.

7. The reinforced gasket material as recited in claim 1, wherein the non-oxidizing high temperature silicate filler comprises mica, vermiculite, talc, wallastonite, kaolinite, and pyrophyllite, or a combination thereof.

8. The reinforced gasket material as recited in claim 1, wherein the reinforced gasket material comprises two or more non-metallic metal scrim layers interposed between the first gasket material layer and the second gasket material layer.

9. The reinforced gasket material as recited in claim 1, wherein the amount of organic binding agent coated on the scrim is from 5 wt % to 60 wt % of the coated scrim.

* * * * *